(12) United States Patent
Queveau et al.

(10) Patent No.: US 7,185,940 B2
(45) Date of Patent: Mar. 6, 2007

(54) RETRACTABLE ROOF FOR A MOTOR VEHICLE

(75) Inventors: Gérard Queveau, Le Pin (FR); Paul Queveau, Montravers (FR); Jean-Marc Guillez, Cirieres (FR)

(73) Assignee: SEBA (Societe Europeenne de Brevets Automobiles), Paris (FR)

( * ) Notice: Subject to any disclaimer, the term of this patent is extended or adjusted under 35 U.S.C. 154(b) by 0 days.

(21) Appl. No.: 10/533,099

(22) PCT Filed: Sep. 5, 2003

(86) PCT No.: PCT/FR03/02660

§ 371 (c)(1),
(2), (4) Date: Nov. 28, 2005

(87) PCT Pub. No.: WO2004/041569

PCT Pub. Date: May 21, 2004

(65) Prior Publication Data

US 2006/0131918 A1  Jun. 22, 2006

(30) Foreign Application Priority Data

Oct. 29, 2002 (FR) .................................. 02 13529

(51) Int. Cl.
*B60J 7/00* (2006.01)
(52) U.S. Cl. .............................. 296/107.18; 296/107.17
(58) Field of Classification Search ........... 296/107.18, 296/107.17, 107.15, 107.19
See application file for complete search history.

(56) References Cited

U.S. PATENT DOCUMENTS 3,536,354 A   10/1970 Ingram ...................... 296/147
5,769,483 A * 6/1998 Danzl et al. ............ 296/107.08
5,979,970 A * 11/1999 Rothe et al. ............ 296/107.18
6,312,042 B1 * 11/2001 Halbweiss et al. ...... 296/107.18
6,331,029 B1 * 12/2001 Schenk ....................... 296/122
6,422,637 B1 * 7/2002 Mac Farland .......... 296/107.17
6,431,636 B1 * 8/2002 Schutt ..................... 296/107.18
6,502,891 B2 * 1/2003 Russke ................... 296/107.17
6,659,534 B2 * 12/2003 Willard .................. 296/107.17
6,666,494 B2 * 12/2003 Antreich ................ 296/107.01

(Continued)

FOREIGN PATENT DOCUMENTS

FR   2 816 248   5/2002

(Continued)

*Primary Examiner*—Kiran B. Patel
(74) *Attorney, Agent, or Firm*—Nawrocki, Rooney & Sivertson, P.A.

(57) ABSTRACT

The invention concerns a retractable roof for a motor vehicle, comprising at least one front roof element and one rear roof element (4), rigid and able to be moved between a closed position in which they cover the vehicle cabin (2) and a storage position in which they are stored in the rear boot (3) of the vehicle, the rear element being arranged so as to be moved by means of pivoting arms and guided by runners (19) extending in the boot.

This roof comprises a first arm (7) articulated transversely to the plane of symmetry of the vehicle, at a first (8) of its ends on the vehicle chassis and at its second end (12) on a first end of a second arm (13) articulated at its second end (14) on the said rear element, also transversely to the plane of symmetry of the vehicle.

4 Claims, 3 Drawing Sheets

U.S. PATENT DOCUMENTS

| | | | |
|---|---|---|---|
| 6,837,533 B2 * | 1/2005 | Wojciech et al. | 296/107.17 |
| 6,866,325 B2 * | 3/2005 | Willard | 296/107.17 |
| 6,871,901 B2 * | 3/2005 | Stenvers et al. | 296/107.17 |
| 6,899,368 B2 * | 5/2005 | Neubrand | 296/107.08 |
| 2003/0085587 A1 * | 5/2003 | Reinsch | 296/107.17 |
| 2003/0218355 A1 * | 11/2003 | Stenvers et al. | 296/108 |
| 2006/0071502 A1 * | 4/2006 | Queveau et al. | 296/107.2 |

FOREIGN PATENT DOCUMENTS

| | | |
|---|---|---|
| FR | 2 816 253 | 5/2002 |
| FR | 2 819 757 | 7/2002 |
| FR | 2 820 691 | 8/2002 |
| JP | 06 286472 A | 10/1994 |

* cited by examiner

RETRACTABLE ROOF FOR A MOTOR VEHICLE

CROSS-REFERENCE TO RELATED APPLICATIONS

This application claims priority of PCT/FR2003/002660 filed on Oct. 5, 2003, which claims priority of French Patent Application No. 02 13529 filed on Oct. 29, 2002.

The present invention concerns a retractable roof for a motor vehicle, and more particular such a roof comprising at least one front roof element and one rear roof element, rigid and able to be moved between a closed position in which they cover the vehicle cabin and a storage position in which they are stored in the rear boot of the vehicle.

Thus a retractable roof for motor vehicles is known, this roof comprising a front roof element, and intermediate roof element and a rear roof element, these three elements being able to move between a position in which they cover the vehicle cabin and a position in which they are superimposed substantially horizontally in the boot.

More particularly, through the documents FR-A-2 819 757, FR-A-2 820 691, FR-A-2 816 248 and FR-A-2 816 253, such retractable roofs are known comprising a rear roof element whose movement towards the boot is controlled by a pivoting arm articulated on the vehicle chassis and which is guided in its movement by a runner extending in the boot.

Such a device for moving the rear part of the boot does however have a drawback. When the length of the rear boot is reduced by accessories such as the location of the rear lights, the length of movement of the rear part may become insufficient so that it is impossible to store this rear roof part in the boot.

The present invention aims to mitigate this drawback.

More particularly, the aim of the invention is to provide a movement system adapting to a reduced boot length.

To this end, the object of the invention is first of all a retractable roof for a motor vehicle, comprising at least one front roof element and one rear roof element, rigid and able to be moved between a closed position in which they cover the vehicle cabin and a storage position in which they are stored in the rear boot of the vehicle, the rear element being arranged so as to be moved by means of pivoting arms and guided by runners extending in the boot, this retractable roof comprising a first arm articulated transversely to the plane of symmetry of the vehicle, at a first of its ends on the vehicle chassis and at its second end on a first end of a second arm articulated at its second end on the said rear element, also transversely to the plane of symmetry of the vehicle.

Naturally, this arrangement can be repeated on both sides of the vehicle, which thus comprises four articulated arms.

This double articulation of a first arm on the vehicle chassis and of a second, intermediate, arm on the first arm requires a lesser length of movement of the rear part of the roof, which can thus be housed in a rear boot with a shorter useful length.

It should also be noted that one or other of the arms, or both, could be composed of two articulated arms or more. It may in fact be cases where more than two articulations would make it possible to further limit the length of movement of the rear part of the roof.

In a particular embodiment, the roof according to the invention comprises first means of driving the first arm in rotation with respect to the vehicle chassis and second means of driving the second arm in rotation with respect to the first arm.

It may also comprise means of synchronising the said first and second driving means.

More particularly, the said synchronisation means can be arranged in order to cause firstly the actuation of the first driving means and the actuation of the second driving means.

Another object of the invention is a motor vehicle comprising a retractable roof as described above.

One embodiment of the invention will now be described by way of non-limiting example with reference to the accompanying schematic drawings, in which.

Figure 1:
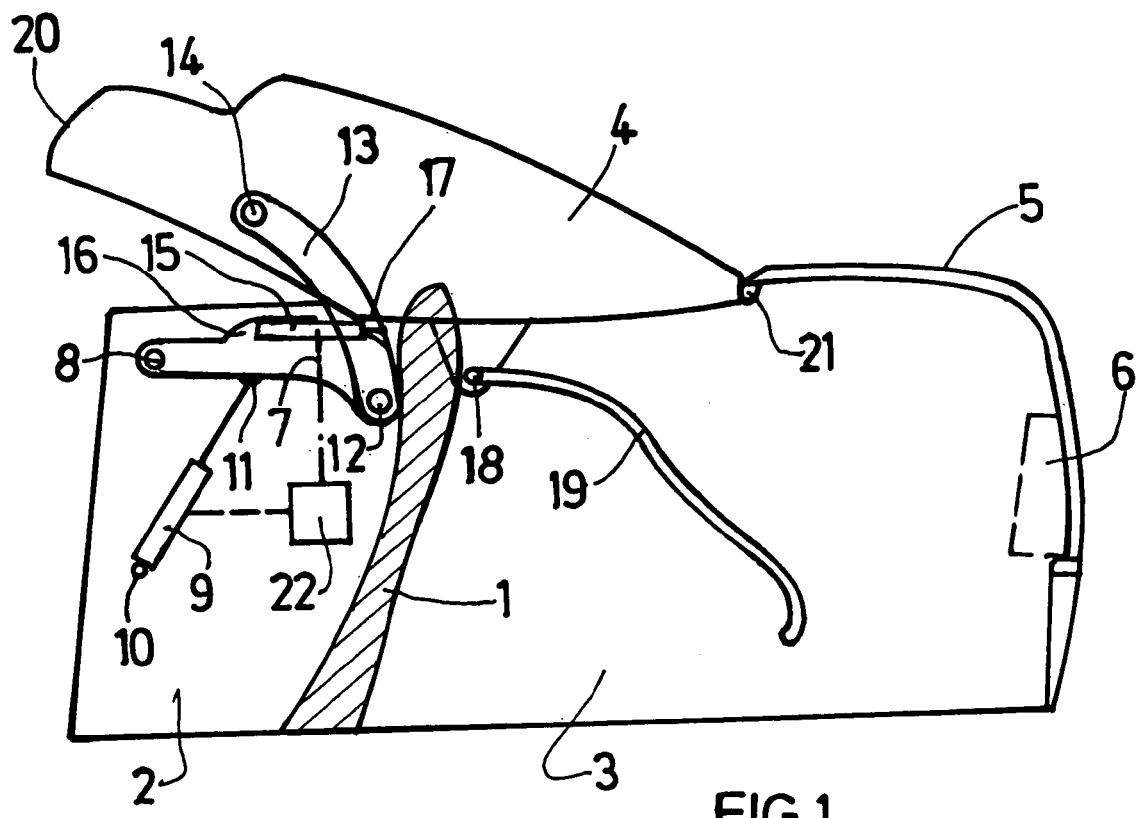
FIG. 1 is view in section of the rear part of a vehicle with a retractable roof with the rear element of the roof in the covering position.

There can be seen in the figures the rear part of a motor vehicle including the back rest 1 of the rear seat separating the cabin 2 from the rear boot 3. The roof is a retractable roof composed of several rigid elements, only the rear element 4 of which is shown. The drawings also show the lid 5 of the rear boot 3, this lid 5 receiving the housings 6 for the rear lights.

On each side of the vehicle, an arm 7 is articulated on the vehicle chassis about an axis 8 substantially perpendicular to the plane of symmetry of the vehicle. The arm 7 is manoeuvred by means of a cylinder 9, one end of which is mounted at 10 on the vehicle chassis and the other end of which is fixed at 11 to the arm 7.

At the end of the arm 7 opposite to the axis 8, an axis 12 parallel to the axis 8 receives a second arm 13. Opposite to the axis 12, the arm 13 is mounted so as to pivot on the rear part 4 of the roof about an axis 14. The shaft 14 is parallel to the axis 8 and 12.

A second cylinder 15 actuates the arm 13 with respect to the arm 7. For this purpose, this cylinder is mounted 16 on a mid-point of the arm 7 and its other end is mounted at 17 on the arm 13.

The arms 7 and 13 raise the rear part 4 of the roof and tilt it towards the rear. This movement is guided by the engagement of a finger 18 in a guide runner 19 housed in the rear boot 3.

FIG. 1 depicts the roof in the covering position in which its elements cover the vehicle cabin 2. In this position, the front edge 20 of the rear element 4 of the roof is in contact with the rear edge of an intermediate element or of a front element, not shown, and the rear edge 21 of the element 4 is in contact with the front edge of the lid 5 of the boot 3.

Figure 2:
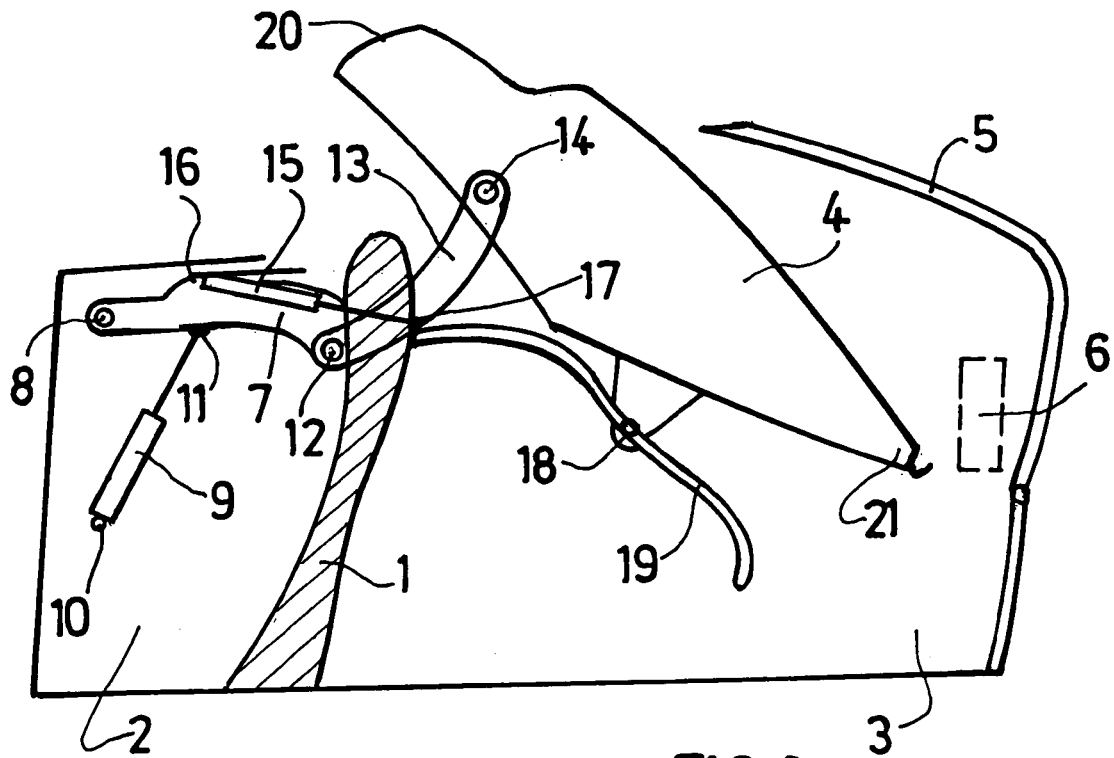
FIG. 2 is a view similar to FIG. 1 with the rear element of the roof in the course of storage.

The passage of the roof into the storage position takes place by, in a known way, raising the front edge of the lid 5 of the boot 3 and making the arm 13 pivot about the shaft 12 by means of the cylinder 15. During this movement, the arm 7 remains fixed. In this way the intermediate position shown in FIG. 2 is arrived at.

Figure 3:
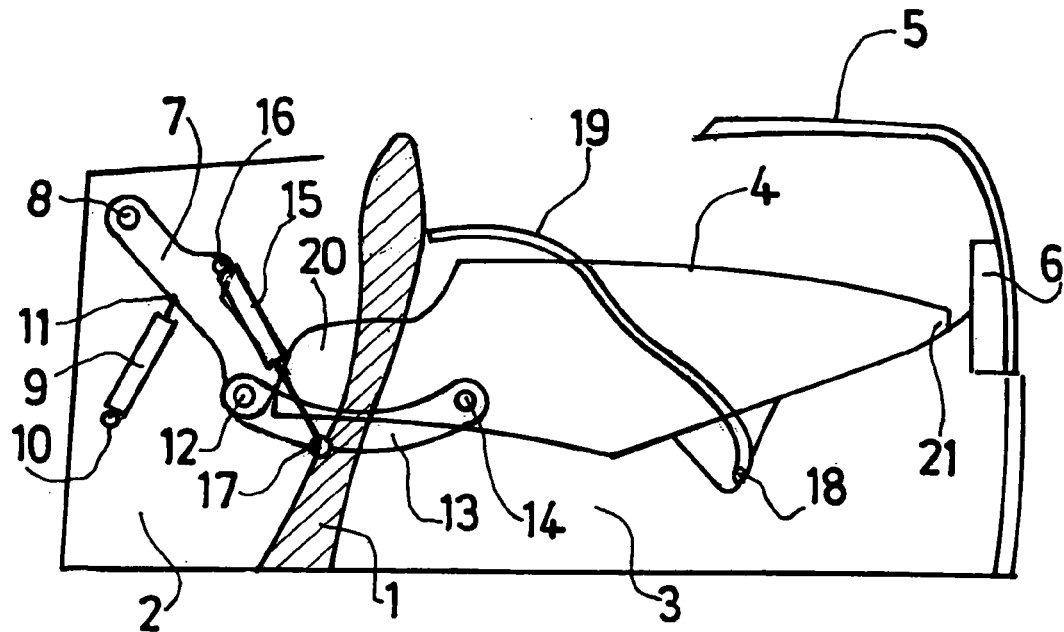
FIG. 3 is a view similar to FIGS. 1 and 2 with the rear part of the roof in the storage position.

The arm 7 is then pivoted about the axis 8 by means of the cylinder 9. During this movement, the relative position of the arms 7 and 13 remains constant. In this way the storage position depicted in FIG. 3 is arrived at.

Naturally, known devices bring the front or possibly intermediate roof elements above the element 4 at the end of storage.

The cylinders 9 and 15 are synchronised as shown in FIG. 1 by means of a control box 22.

Figure 4:
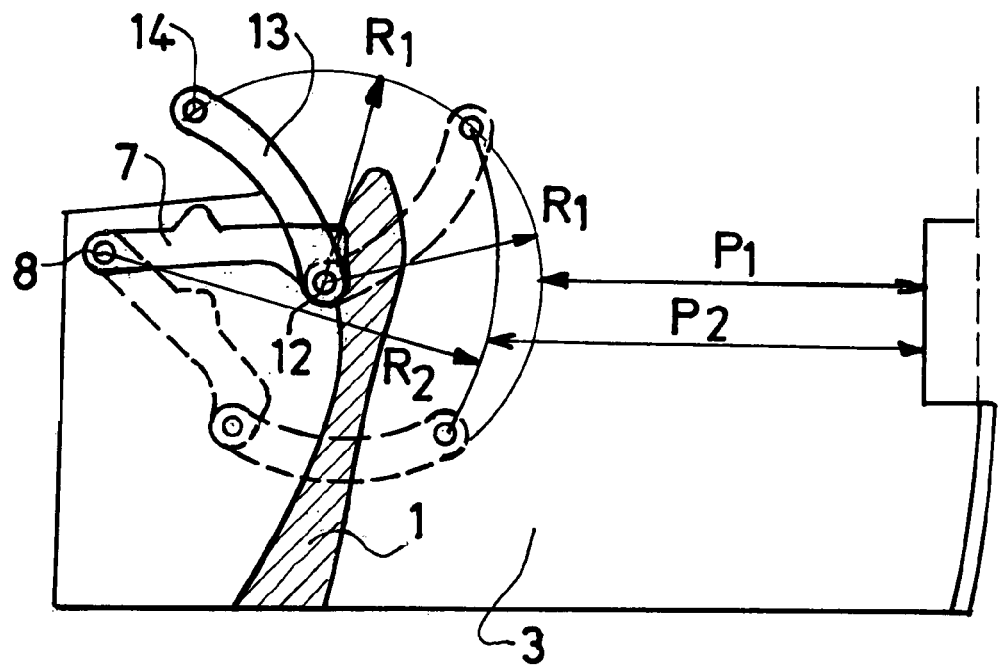
FIG. 4 illustrates the storage kinematics of the rear part of the roof.
Figure 5:
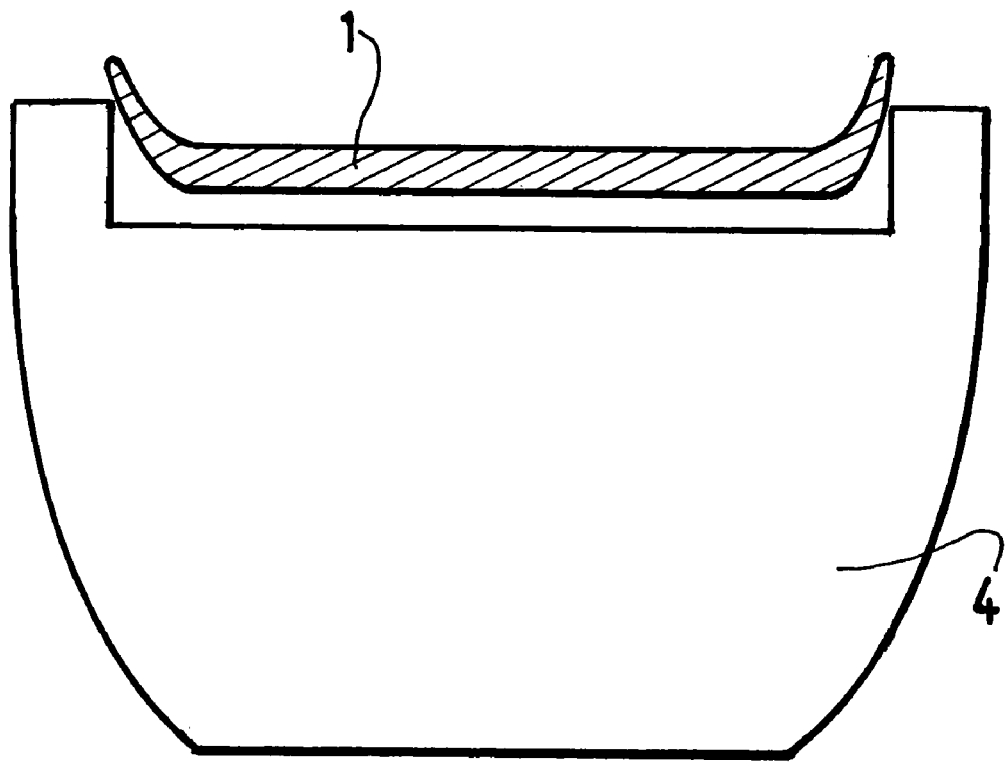
FIG. 5 is a top view corresponding to FIG. 3.

It can be seen in FIG. 4 that the use of the two arms 7 and 13 leads to an increase in the length of movement in the boot 3 from $l_1$ to $l_2$. This is because the use of a single lever causes a circular movement of the axis 14 on a radius R1 over the entire movement travel whilst, by virtue of the use of the two arms, the movement of the radius $R_1$ is limited to a certain angle and then continues over a radius $R_2$.

The invention claimed is:

1. A retractable roof for a motor vehicle, comprising at least one front roof element and one rear roof element, rigid and able to be moved between a closed position in which they cover the vehicle cabin and a storage position in which they are stored in the rear boot of the vehicle, the rear element being arranged so as to be moved by means of pivoting arms and guided by runners extending in the boot, said roof comprising a first arm articulated transversely to the plane of symmetry of the vehicle, at a first of its ends on the vehicle chassis and at its second end on a first end of a second arm articulated at its second end on said rear element, also transversely to the plane of symmetry of the vehicle, characterized by the fact it comprises first means of driving the first arm in rotation with respect to the vehicle chassis and second means of driving the second arm in rotation with respect to the first arm.

2. A roof according to claim 1, characterized by the fact that it comprises means of synchronizing said first and second driving means.

3. A roof according to claim 2, characterized by the fact that said synchronization means are arranged so as to cause firstly actuation of the first driving means and then the actuation of the second driving means.

4. A motor vehicle, characterized by the fact that it comprises a retractable roof according to claim 1.

* * * * *